United States Patent
Wilson et al.

(10) Patent No.: US 6,208,244 B1
(45) Date of Patent: Mar. 27, 2001

(54) COMBINATION MONITORING DEVICE AND PATCH FOR A PNEUMATIC TIRE AND METHOD OF INSTALLING THE SAME WITH A COUPLED ANTENNA

(75) Inventors: Paul B. Wilson, Murfreesboro, TN (US); Robert J. Trew, Arlington, VA (US); Russell W. Koch, Hartville, OH (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/301,793

(22) Filed: Apr. 29, 1999

(51) Int. Cl.$^7$ .................................................. B60C 23/00
(52) U.S. Cl. ..................... 340/447; 340/445; 340/448; 73/146.2; 343/873
(58) Field of Search ................................ 340/442, 445, 340/447, 448, 443; 73/146.2, 146.8; 343/873

(56) References Cited

U.S. PATENT DOCUMENTS

| | | | |
|---|---|---|---|
| 2,274,557 | 2/1942 | Morgan et al. ...................... | 177/351 |
| 3,614,732 | 10/1971 | Lejeune .................................. | 340/58 |
| 3,806,869 | 4/1974 | Davis, Jr. .............................. | 340/58 |
| 3,806,905 | 4/1974 | Strenglein ............................ | 340/224 |
| 4,010,354 | 3/1977 | Apicella, Jr. et al. .......... | 235/61.6 R |
| 4,067,235 | 1/1978 | Markland et al. .................. | 73/146.5 |
| 4,075,603 | 2/1978 | Snyder et al. ........................ | 340/58 |
| 4,103,283 | 7/1978 | Lee ........................................ | 340/58 |
| 4,110,732 | 8/1978 | Jarocha et al. ....................... | 340/58 |
| 4,137,520 | 1/1979 | Deveau ................................. | 340/58 |
| 4,160,234 | 7/1979 | Karbo et al. .......................... | 340/58 |

(List continued on next page.)

FOREIGN PATENT DOCUMENTS

| | | |
|---|---|---|
| 0 505 905 A1 | 9/1992 | (EP) . |
| 0 906 839 A2 | 4/1999 | (EP) . |
| WO 90/12474 | 10/1990 | (WO) . |
| WO 99/29523 | 6/1999 | (WO) . |
| WO 99/29524 | 6/1999 | (WO) . |
| WO 99/29525 | 6/1999 | (WO) . |
| WO 99/53740 | 10/1999 | (WO) . |
| WO 00/07834 | 2/2000 | (WO) . |
| WO 00/08598 | 2/2000 | (WO) . |

OTHER PUBLICATIONS

Tigris: A Vehicle Tracking System using Passive Radio Transponders, IEEE, 1993.

Antenna Polarization Considerations, Nov. 1998 edition of Wireless Design & Development.

*Primary Examiner*—Daryl Pope
(74) *Attorney, Agent, or Firm*—Fred H. Zollinger, III; Thomas R. Kingsbury (57) ABSTRACT

A monitoring device and patch combination used to monitor the conditions of a pneumatic tire having an innerliner includes a monitoring device and a patch. The monitoring device includes at least one sensing element that is adapted to sense a condition of the pneumatic tire. The monitoring device also includes a first electrical pad connected to the sensing element. The monitoring device and first electrical pad are preferably encapsulated in an encapsulation material. The patch is adapted to carry the monitoring device and mount the monitoring device on the innerliner of the tire. An antenna is embedded within the patch and a second electrical pad is connected to the antenna. The monitoring device is disposed on the patch in a manner such that the first and second electrical pads are aligned to provide electrical coupling between the pads. The antenna is in communication with the sensing element through the electrical coupling between the pads. The monitoring device and patch may be manufactured in separate facilities and then brought together when they are connected to the innerliner of the tire without the requirement of a physical connection between the sensing element and the antenna.

49 Claims, 4 Drawing Sheets

U.S. PATENT DOCUMENTS

| | | |
|---|---|---|
| 4,237,728 | 12/1980 | Betts et al. ............................ 73/146.5 |
| 4,311,985 | 1/1982 | Gee et al. ................................ 340/58 |
| 4,334,215 | 6/1982 | Frazier et al. ......................... 340/539 |
| 4,409,586 | 10/1983 | Hochstein ................................ 340/58 |
| 4,494,106 | 1/1985 | Smith et al. ............................. 340/58 |
| 4,570,152 | 2/1986 | Melton et al. ........................... 340/58 |
| 4,578,992 | 4/1986 | Galasko et al. ...................... 73/146.5 |
| 4,588,978 | 5/1986 | Allen ....................................... 340/58 |
| 4,609,905 | 9/1986 | Uzzo ....................................... 340/58 |
| 4,695,823 | 9/1987 | Vernon .................................... 340/58 |
| 4,717,905 | 1/1988 | Morrison, Jr. et al. ................ 340/58 |
| 4,816,839 | 3/1989 | Landt ..................................... 343/795 |
| 4,845,649 | 7/1989 | Eckardt et al. .................. 364/571.02 |
| 4,862,486 | 8/1989 | Wing et al. ............................. 377/16 |
| 4,911,217 | 3/1990 | Dunn et al. .......................... 152/152.1 |
| 5,181,975 | 1/1993 | Pollack et al. ....................... 152/152.1 |
| 5,218,861 | 6/1993 | Brown et al. ........................ 73/146.5 |
| 5,223,851 | 6/1993 | Hadden et al. ....................... 343/873 |
| 5,231,872 | 8/1993 | Bowler et al. ....................... 73/146.5 |
| 5,235,850 | 8/1993 | Schurmann ......................... 73/146.5 |
| 5,285,189 | 2/1994 | Nowicki et al. ...................... 340/447 |
| 5,319,354 | 6/1994 | Myatt .................................... 340/572 |
| 5,348,067 | 9/1994 | Myatt ................................. 152/152.1 |
| 5,413,159 | 5/1995 | Olney et al. .......................... 152/418 |
| 5,479,171 | 12/1995 | Schuermann .......................... 342/44 |
| 5,483,826 | 1/1996 | Schultz et al. ....................... 73/146.5 |
| 5,483,827 | 1/1996 | Kulka et al. ......................... 73/146.5 |
| 5,500,065 | 3/1996 | Koch et al. ........................... 156/123 |
| 5,531,109 | 7/1996 | Tsagas ................................. 73/146.5 |
| 5,559,484 | 9/1996 | Nowicki et al. ...................... 340/447 |
| 5,562,787 | 10/1996 | Koch et al. ............................. 156/64 |
| 5,573,610 | 11/1996 | Koch et al. ........................ 152/152.1 |
| 5,573,611 | 11/1996 | Koch et al. ........................ 152/152.1 |
| 5,600,301 | 2/1997 | Robinson, III ....................... 340/442 |
| 5,731,754 | 3/1998 | Lee, Jr. et al. ....................... 340/447 |
| 5,790,016 | 8/1998 | Konchin et al. ..................... 340/448 |
| 5,824,891 | 10/1998 | Monson ............................... 73/146.5 |
| 5,883,305 | 3/1999 | Jo et al. ............................... 73/146.5 |
| 5,977,870 * | 11/1999 | Rensel et al. ........................ 340/447 |

\* cited by examiner

COMBINATION MONITORING DEVICE AND PATCH FOR A PNEUMATIC TIRE AND METHOD OF INSTALLING THE SAME WITH A COUPLED ANTENNA

BACKGROUND OF THE INVENTION

1. Technical Field

The present invention generally relates to monitoring devices used to monitor the conditions of a pneumatic tire and, more particularly, to a monitoring device and patch combination with the antenna of the monitoring device disposed in the patch and being electrically coupled to the monitoring device when the combination is assembled. Specifically, the present invention relates to an encapsulated monitoring device having a first electrical pad that is aligned with a second electrical pad in a patch wherein the connection between an antenna in the patch and the monitoring device is established by electrical coupling between the aligned electrical pads.

2. Background Information

It is often desired in the art to monitor the conditions of a tire while it is installed and in use on a vehicle. Typical desirable measurements are tire wear, internal temperature, and internal pressure. These measurements are preferably taken while the tire is in use on the vehicle without having to remove the tire from the vehicle or specifically position the tire to take the measurement. Numerous types of monitoring devices are known in the art to perform these measurements. One type of monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the data created by the monitoring device to the data gathering device positioned outside of the tire. One of the problems in the art is to position the antenna such that the data created by the monitoring device is accurately transmitted to the data gathering device outside of the tire. It is desired to position the antenna as close to the outside of the pneumatic tire as possible so that the transmissions pass through as little of the tire as possible. In the past, the antenna of the monitoring device generally extended into the interior chamber of the tire such that the radio waves had to pass first through the air inside the tire, through the innerliner, through the tire sidewall, and then through the air to the data gathering device. It is desired in the art to provide an antenna for an active, self-powered programmable electronic device that is positioned so that the radio waves do not have to first pass through the inner chamber of the tire before entering the tire sidewall. The bead ring and apex filler of the tire tend to block the radio transmission from the monitoring device. It is thus desired in the art to position the antenna away from the bead ring and apex filler so that the transmission through the tire sidewall is as strong as possible. On the other hand, it is also desirable to position the monitoring device as close to the bead ring as possible because that area of the tire sidewall experiences fewer forces and stretching than the middle portion of the tire sidewall. It is thus desired in the art to provide a method for attaching the antenna to the monitoring device that accommodates the ideal position for both elements.

The monitoring devices known in the art are typically encapsulated with an encapsulation material that provides structural support to the monitoring device so that the device is not destroyed by the forces normally encountered and experienced by a pneumatic tire. In some applications, the process of encapsulation will take into account that the antenna must extend from the encapsulated monitoring device. It is desired to provide a monitoring device configuration that eliminates this encapsulation problem by positioning the antenna apart from the monitoring device.

One method of connecting the monitoring device to the innerliner of a tire includes the use of a rubber attachment patch to carry the monitoring device with the inner surface of the rubber patch being configured to securely adhere to the innerliner of a tire. It is desired that the sensitive electronic monitoring device and the rubber patch be capable of being manufactured in separate locations and assembled when the monitoring device is attached to the innerliner of a tire. Separating the rubber attachment patch and the sensitive monitoring device also allows the rubber attachment patch to be aggressively attached to the innerliner of a tire without the risk of damaging the sensitive monitoring device. After the rubber attachment patch is securely anchored to the innerliner, the monitoring device may be attached to the patch.

SUMMARY OF THE INVENTION

In view of the foregoing, it is an objective of the present invention to provide a monitoring device and patch that may be fabricated at separate manufacturing facilities and then connected together when the monitoring device is installed in a pneumatic tire.

Another objective of the present invention is to provide a monitoring device and patch combination wherein the antenna for the monitoring device is carried by the patch.

A further objective of the present invention is to provide a monitoring device and patch combination that positions the antenna in a manner that causes the radio signal to pass directly into the tire sidewall away from the bead ring and apex filler of the tire.

Another objective of the present invention is to provide a monitoring device and patch combination that positions the monitoring device close to the bead ring and apex filler of the tire and positions the antenna away from the bead ring and apex filler.

Another objective of the present invention is to provide a monitoring device and patch combination that does not require a physical connection between the antenna and the monitoring device.

Another objective of the present invention is to provide a monitoring device that may be connected directly to the innerliner of a tire wherein the antenna of the monitoring device is embedded within the innerliner and the attachment of the monitoring device to the innerliner automatically forms an electrical connection between the antenna and the monitoring device.

A further objective of the present invention is to provide a method for installing a monitoring device on the innerliner of a tire that lacks the step of directly physically connecting the antenna with the monitoring device.

Another objective of the present invention is to provide a method for installing a monitoring device on the innerliner of a pneumatic tire that automatically provides the communication between the antenna and the monitoring device when the monitoring device is properly aligned with the patch that connects the monitoring device to the innerliner of the tire.

Another objective of the present invention is to provide a method and combination that are simple, that achieve the stated objectives in a simple, effective, and inexpensive manner, that solve the problems, and that satisfy the needs existing in the art.

These and other objectives and advantages of the present invention are obtained by a monitoring device and patch combination used to monitor the conditions of a pneumatic tire having an innerliner, the combination including a monitoring device having at least one sensing element; a first electrical pad connected to the sensing element; a patch carrying the monitoring device, the patch adapted to connect the monitoring device to the innerliner of the pneumatic tire; an antenna carried by the patch; and a second electrical pad carried by the patch, the second electrical pad connected to the antenna; the first and second electrical pads being spaced apart but aligned wherein the sensing element is in communication with the antenna by electrical coupling between the electrical pads.

Other objectives and advantages of the invention are obtained by a method of mounting a monitoring device on the innerliner of a tire including the steps of providing a monitoring device having at least one sensing element and a first electrical pad connected to the sensing element; providing a patch having an antenna and a second electrical pad connected to the antenna; aligning the first and second electrical pads; connecting the monitoring device to the patch such that the first electrical pad is aligned with the second electrical pad wherein the sensing element is in communication with the antenna by electrical coupling between the pads; and connecting the patch to the innerliner of the tire.

BRIEF DESCRIPTION OF THE DRAWINGS

The preferred embodiments of the invention, illustrative of the best mode in which the applicants contemplate applying the principles of the invention, are set forth in the following description and are shown in the drawings and is particularly and distinctly pointed out and set forth in the appended claims.

Similar numerals refer to similar parts throughout the drawings.

DESCRIPTION OF THE PREFERRED EMBODIMENT

Figure 1:
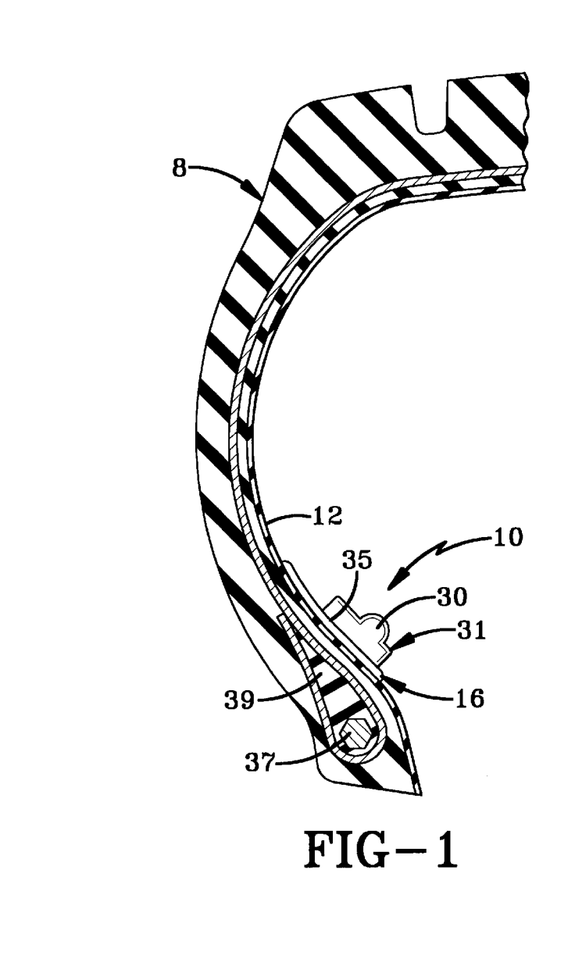
FIG. 1 is a partial sectional view of a pneumatic tire with the monitoring device and patch combination connected to the innerliner of the pneumatic tire.

The first embodiment of the monitoring device and patch combination of the present invention is depicted in FIGS. 1–5 and is indicated generally by the numeral 10. Combination 10 is connected to an innerliner 12 of a pneumatic tire 8 as shown in FIG. 1. Combination 10 preferably is connected to innerliner 12 by an attachment that is known in the art, such as a suitable adhesive.

Figure 2:
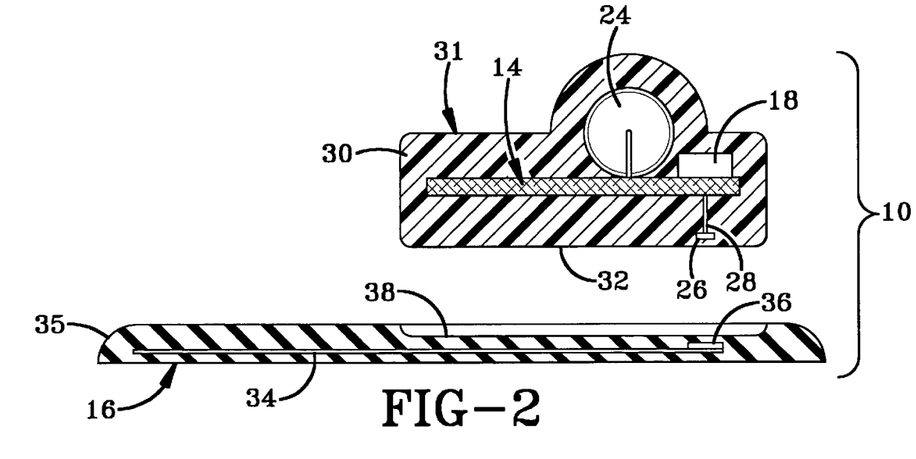
FIG. 2 is a sectional side view of the monitoring device and patch combination of the present invention.
Figure 3:
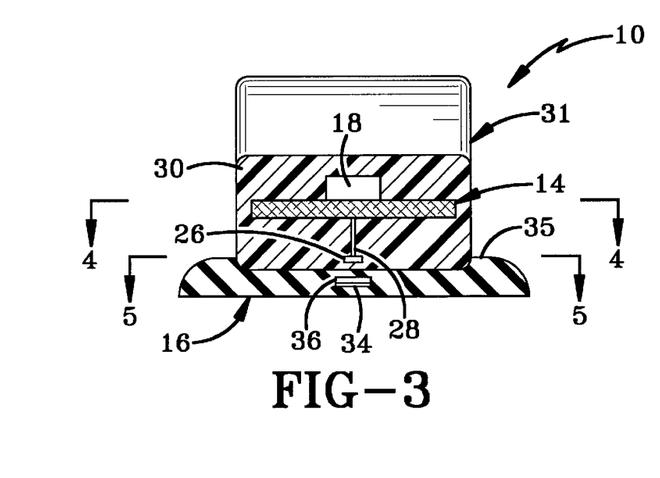
FIG. 3 is a sectional end view of the monitoring device and patch combination showing the alignment of the first electrical pad with the second electrical pad.
Figure 4:
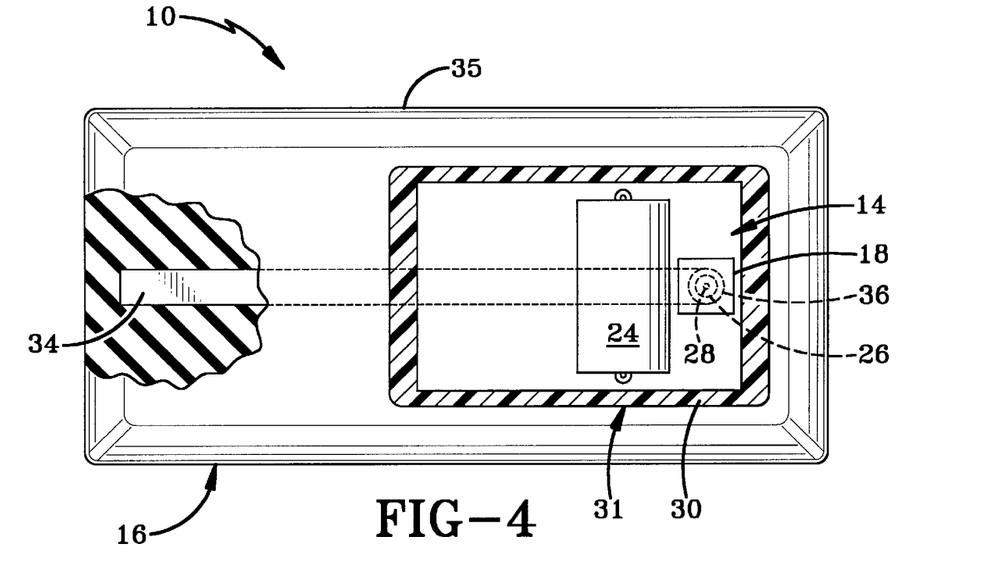
FIG. 4 is a sectional view taken along line 4—4, FIG. 3.
Figure 5:
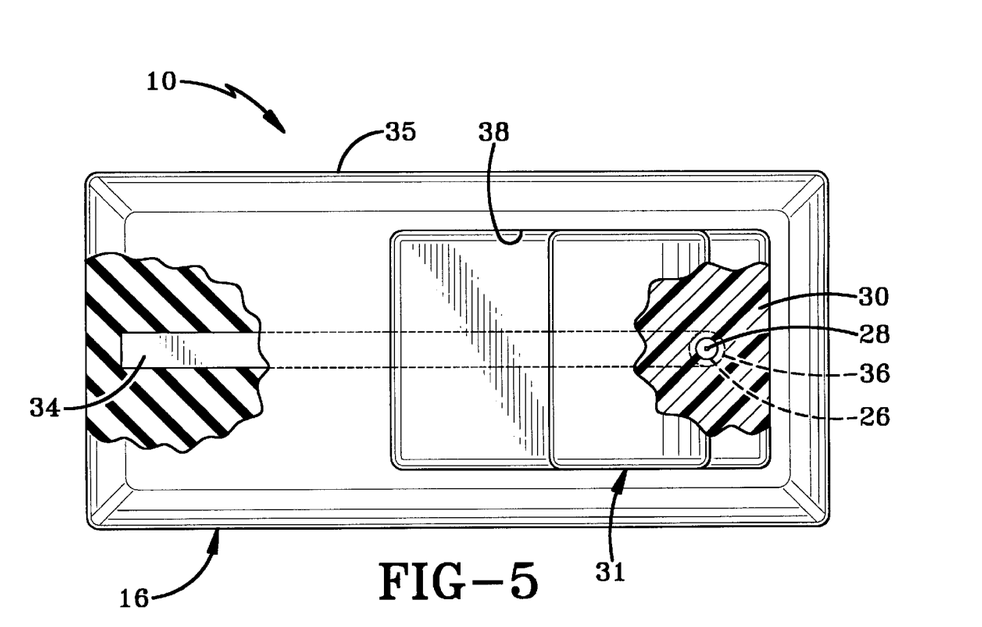
FIG. 5 is a fragmentary sectional view taken along line 5—5, FIG. 3 showing a portion of the encapsulated monitoring device in section and a portion of the patch in section.

Combination 10 includes a monitoring device 14 and an attachment patch 16 that are fabricated separately. Monitoring device 14 includes at least one sensing element 18 that is configured and adapted to read at least one desired parameter or sense at least one desired engineering condition of pneumatic tire 8. Monitoring device 14 further includes a power source or battery 24 that supplies power to monitoring device 14. In addition to the devices discussed above, other examples of monitoring devices are shown in U.S. Pat. No. 5,573,610, the contents of which are incorporated herein by reference. Sensing element 18 is connected to a first electrical pad 26 by a suitable connector 28 such as a wire. Electrical pad 26 may be spaced from monitoring device 14 or may be an integral element of monitoring device 14.

Monitoring device 14 and first electrical pad 26 are preferably encapsulated by an encapsulation material 30 that serves to protect monitoring device 14. Encapsulation material 30 may be a suitable epoxy or plastic that provides a rigid structure around monitoring device 14 and electrical pad 26. Encapsulation material 30 forms an encapsulated monitoring device 31 that includes a bottom surface 32 that provides a mounting surface for encapsulated monitoring device 31. Bottom surface 32 has at least one portion that is substantially planar. First electrical pad 26 is substantially parallel to the planar portion of bottom surface 32 and is also adjacent to bottom surface 32, but is still completely surrounded by encapsulation material 30.

Patch 16 includes an antenna 34 embedded within the body of the patch A second electrical pad 36 is connected to antenna 34 and is also embedded within patch 16. Patch 16 may be formed from a suitable rubber or combination of rubbers that are compatible with and provide desirable adhesion properties with innerliner 12. Patch 16 has a top surface 38 sized and adapted to receive encapsulated monitoring device 31 such that bottom surface 32 lies against top surface 38 when encapsulated monitoring device 31 is connected to patch 16. Second electrical pad 36 is adjacent to top surface 38 but spaced therefrom by the material of patch 16. Second electrical pad 36 may be integrally formed with antenna 34 and, in some embodiments of the invention, may simply be a portion of antenna 34 disposed where it may electrically couple through the material of patch 16. Antenna 34 may be any of a variety of suitable antennas such as a wire, a bar, a plate, or the like.

In accordance with one of the objectives of the present invention, patch 16 includes a foot portion 35 that extends away from top surface 38. Antenna 34 is embedded within foot portion 35 such that it is positioned away from encapsulated monitoring device 31. Foot portion 35 of patch 16 allows encapsulated monitoring device 31 to be positioned closer to the bead ring 37 and apex filler 39 of tire 8 than antenna 34. Such positioning allows the signals from antenna 34 to propagate around bead ring 37 and apex filler 39.

In accordance with another of the objectives of the present invention, first electrical pad 26 is aligned with second electrical pad 36 when encapsulated monitoring device 31 is mounted on patch 16. Although first and second electrical pads 26 and 36 are aligned, they remain spaced from each other by the intervening material of patch 16 and encapsulation material 30. Electrical pads 26 and 36 are close enough, however, to create an electrical coupling such that sensing element 18 is in communication with antenna 34. Such electrical coupling is known to those skilled in the art and allows a signal to be communicated between pads 26 and 36. Such alignment and spacing is in accordance with another objective of the present invention that allows encapsulated monitoring device 31 to be installed on patch 16 without requiring a direct physical electrical connection between antenna 34 and monitoring device 14.

Monitoring device 14 and patch 16 may be connected to innerliner 12 in the following manner. First, monitoring device 14 is provided with sensing element 18, first electrical pad 26, and connector 28. Monitoring device 14 is then encapsulated with encapsulation material 30 to entirely encapsulate monitoring device 14 and first electrical pad 26. Patch 16 is then fabricated with antenna 34 embedded within the body of patch 16. Antenna 34 is connected to second electrical pad 36 that is also embedded within the body of patch 16. The steps of fabricating device 31 and patch 16 may be performed at separate locations because no physical connection between antenna 34 and device 31 is required.

Pneumatic tire 8 is then selected having innerliner 12 where combination 10 is installed. Encapsulated monitoring device 31 first may be connected to patch 16 by aligning first electrical pad 26 with second electrical pad 36. Encapsulated monitoring device 31 is then connected to patch 16 by seating bottom surface 32 of encapsulated monitoring device 31 onto top surface 38 of patch 16. A suitable manner of connecting the two elements is used such as a suitable adhesive.

Device 31 and patch 16 are then connected to innerliner 12 by a suitable connector such as an adhesive. The connection of combination 10 to innerliner 12 thus does not require a direct physical electrical connection between antenna 34 and monitoring device 14. The alignment of electrical pads 26 and 36 and the resulting electrical coupling provides the necessary communication between antenna 34 and monitoring device 14.

Combination 10 may also be installed on pneumatic tire 8 by first connecting patch 16 to innerliner 12. Patch 16 may be aggressively stitched to innerliner 12 without the danger of damaging monitoring device 14 because monitoring device 14 is later connected to patch 16. After patch 16 is suitably connected to innerliner 12, monitoring device 14 is aligned with patch 16 as discussed above and connected by a suitable connector such as an adhesive. The communication between antenna 34 and monitoring device 14 is automatically created when electrical pads 26 and 36 are properly aligned, namely signal coupling is achieved between the antenna and monitoring device without any physical electrical connection therebetween.

Figure 6:
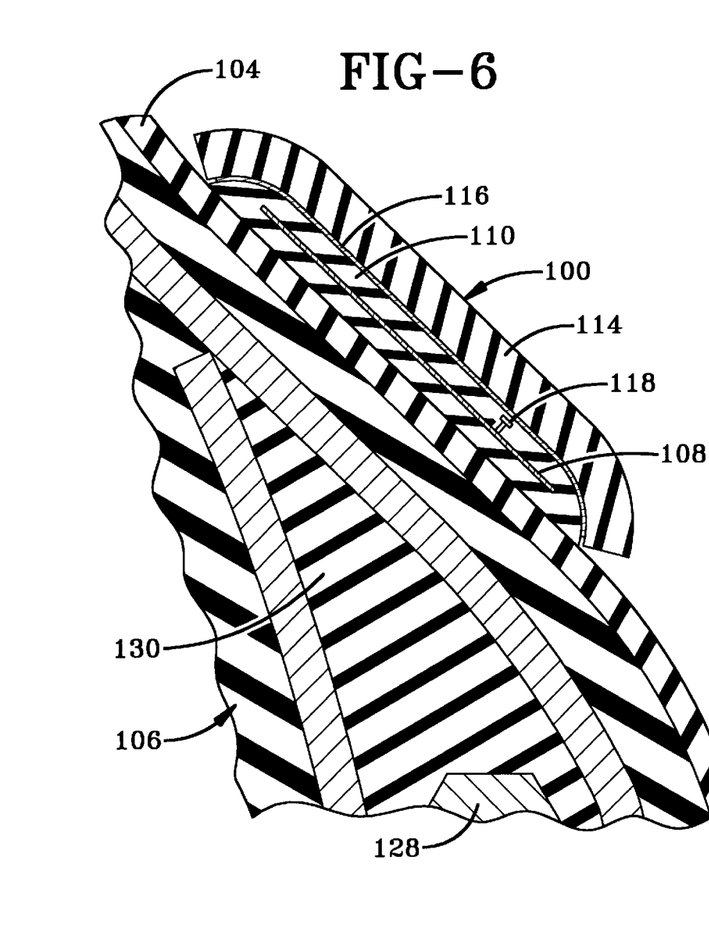
FIG. 6 is a sectional view similar to FIG. 1 showing an alternative embodiment of the present invention.
Figure 7:
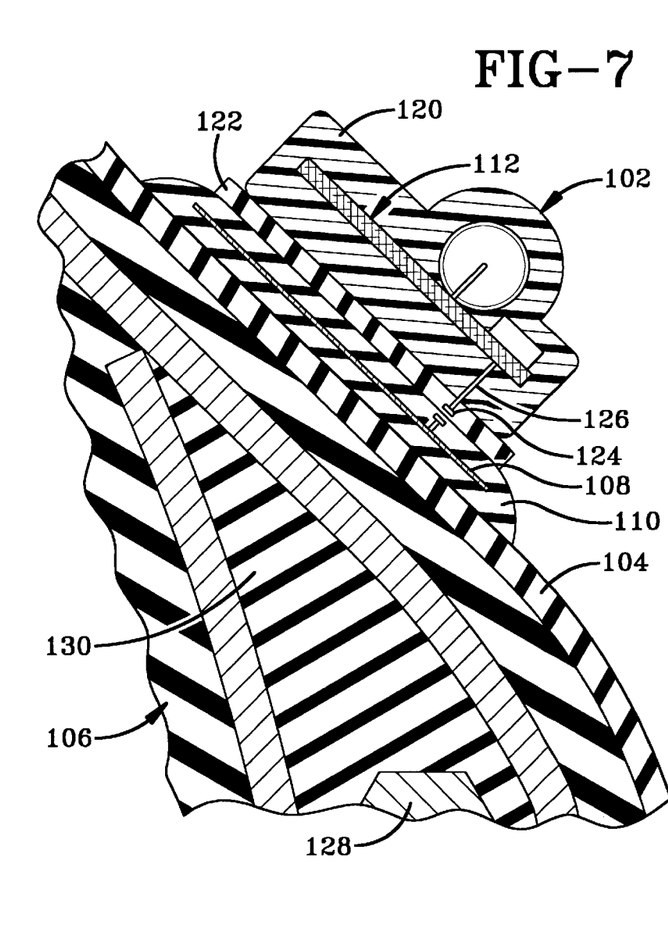
FIG. 7 is a sectional view similar to FIG. 6 showing the attachment of the monitoring device to the innerliner of a tire with the first alternative embodiment of the present invention.

A first alternative embodiment of the invention is depicted in FIGS. 6 and 7 In the first alternative embodiment, an anchoring patch 100 is used to connect the encapsulated monitoring device 102 to the innerliner 104 of a tire 106. In accordance with one of the objectives of the present invention, an antenna 108 is embedded within an anchoring layer 110 of anchoring patch 100. Communication is provided between antenna 108 and a monitoring device 112 when monitoring device 112 is attached to anchoring layer 110. The communication is provided through electrical coupling.

Anchoring patch 100 includes a cover 114 formed from any of a variety of cured rubbers that is separated from anchoring layer 110 by a layer of cure material 116 such as cure paper or cure cloth. Anchoring layer 110 is fabricated from an uncured rubber that may be a dual cure rubber or a rubber cured either by heat or by a chemical reaction. Examples of anchoring patch 100 and methods for using the patch are taught in United States patent applications Ser. Nos. 09/206,273 and 09/205,931, filed Dec. 4, 1998. Antenna 108 is connected to an electrical pad 118 that helps provide the electrical coupling between antenna 108 and monitoring device 112. Electrical pad 118 may be an integral part of antenna 108, an extension of antenna 108, or a separate element that is connected to antenna 108. Electrical pad 118 may be positioned adjacent the outer surface of anchoring layer 110.

Encapsulated monitoring device 102 includes monitoring device 112 surrounded by an encapsulation material 120. Encapsulated monitoring device 102 is mounted on an attachment patch 122 that is used to mount encapsulated monitoring device 102 on tire 106. Another electrical pad 124 is disposed in attachment patch 122 and is directly connected to monitoring device 112 by a suitable connector 126. In other embodiments of the invention, the connection between electrical pad 124 and monitoring device 112 is formed by electrical coupling as described above.

As shown in the drawings, the position of antenna 108 may be located away from bead ring 128 and apex filler 130 while allowing monitoring device 112 to be disposed closer to bead ring 128. The length and configuration of antenna 108 is not limited by the overall size of encapsulated monitoring device 102 or attachment pad 122 and may be configured to provide reliable communication with the data-gathering device positioned outside tire 106.

Monitoring device 112 may be mounted on tire 106 in the following manner. First, anchoring patch 100 is adhered to innerliner 104 by a suitable adhesive or by curing anchoring patch 100 to innerliner 104. This cure may be a chemical cure or a heat cure performed during the curing of the green tire. After anchoring patch 100 has been cured, cover 114 and cure material 116 are removed to allow attachment patch 122 carrying encapsulated monitoring device 102 to be directly adhered to anchoring layer 110. Attachment patch 122 may be adhered to anchoring layer 110 by a suitable adhesive or by providing a layer of uncured rubber such as a cushion gum or dual cure rubber on the outer surface of attachment patch 122 which is then cured to anchoring layer 110.

Encapsulated monitoring device 102 is first positioned such that electrical pads 118 and 124 are aligned. Encapsulated monitoring device 102 and attachment patch 122 are then attached to anchoring layer 110. Electrical pads 118 and 124 remain aligned but spaced such that they provide electrical coupling between antenna 108 and electronic monitoring device 112.

Figure 8:
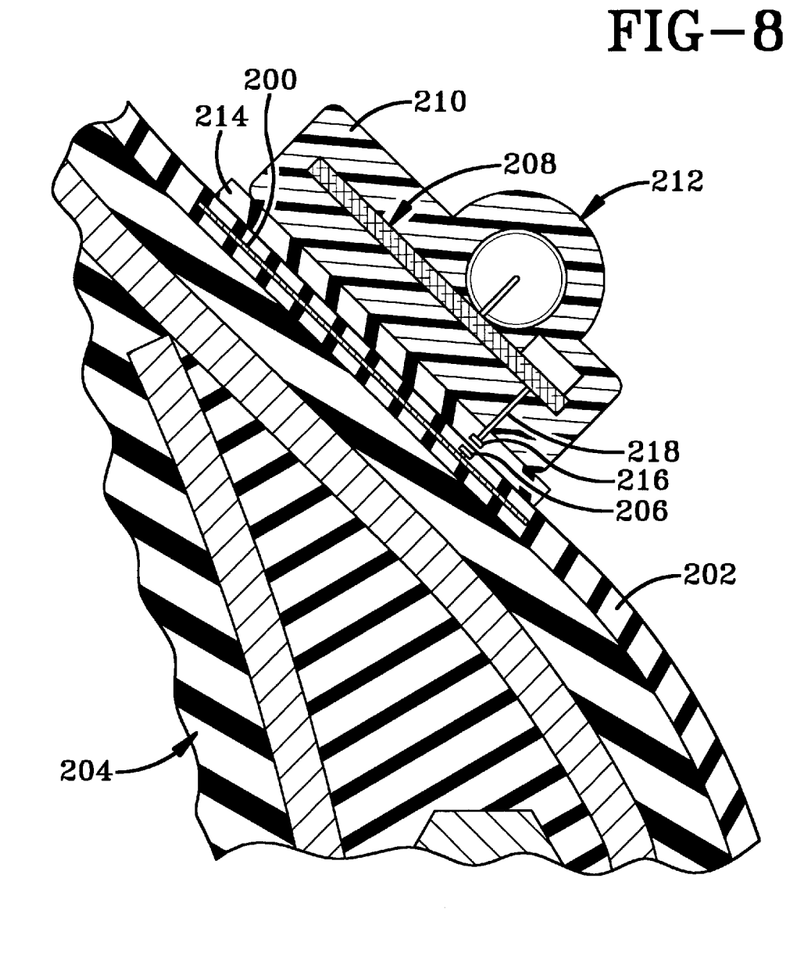
FIG. 8 is a sectional view similar to FIGS. 6 and 7 showing a second alternative embodiment of the present invention.

A second alternative embodiment of the present invention is depicted in FIG. 8. In the second alternative embodiment, the antenna 200 is embedded within the innerliner 202 of the tire 204. Antenna 200 is embedded within innerliner 202 during the manufacture of innerliner 202 and may be ideally configured to communicate with a data gathering device (not shown) that is positioned outside of tire 204. An electrical pad 206 is connected to antenna 200 and provides communication between antenna 200 and an electronic monitoring device 208. Electrical pad 206 may be an integral part of antenna 200 and simply may be a portion of antenna 200 that is disposed in the correct position to function as electrical pad 206.

Electronic monitoring device 208 is encapsulated with an encapsulation material 210 to form encapsulated monitoring device 212. Encapsulated monitoring device 212 is mounted on attachment patch 214. Another electrical pad 216 is embedded within attachment patch 214 and directly connected to electronic monitoring device 208 by a suitable connector 218. The connection between electrical pad 216 and electronic monitoring device 208 may be the direct connection depicted in FIG. 8 or may be formed by electrical coupling as described above with respect to FIGS. 1–5.

Encapsulated monitoring device 212 is attached to attachment patch 214 by suitable means such as an adhesive. Attachment patch 214 is connected to innerliner 202 by suitable means such as an adhesive. Communication between antenna 200 and electronic monitoring device 208 is provided by aligning electrical pads 206 and 216 and then connecting attachment patch 214 to innerliner 202. Electrical pads 206 and 216 are aligned but spaced to provide electrical coupling through the material of innerliner 202 and attachment patch 214. The electrical coupling provides communication between antenna 200 and electronic monitoring device 208.

Accordingly, the improved monitoring device and patch combination is simplified, provides an effective, safe, inexpensive, and efficient device that achieves all the enumerated objectives of the invention, provides for eliminating difficulties encountered with prior devices, and solves problems and obtains new results in the art.

In the foregoing description, certain terms have been used for brevity clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the monitoring device and patch combination is constructed and used, the characteristics of the construction, and the advantageous new and useful results obtained, the new and useful structures, devices, elements, arrangements, parts, combinations, and methods are set forth in the appended claims.

What is claimed is:

1. A monitoring device and patch combination used to monitor the conditions of a pneumatic tire having an innerliner, the combination comprising:
    a monitoring device having at least one sensing element;
    a patch carrying said monitoring device, said patch adapted to connect the monitoring device to the innerliner of the pneumatic tire;
    an antenna carried by said patch; the monitoring device being free of a direct physical connection with the antenna; and
    said monitoring device and said antenna being spaced apart and aligned to provide a signal coupling between said monitoring device and said antenna.

2. The combination of claim 1, further comprising a first electrical pad connected to said monitoring device and a second electrical pad connected to said antenna; said electrical pads being spaced apart and aligned to provide the signal coupling between the monitoring device and the antenna.

3. The combination of claim 2, wherein said monitoring device is encapsulated by an encapsulation material to form an encapsulated monitoring device.

4. The combination of claim 3, wherein said first electrical pad is also encapsulated by said encapsulation material.

5. The combination of claim 4, wherein said encapsulated monitoring device has a bottom surface, said first electrical pad disposed adjacent said bottom surface.

6. The combination of claim 5, wherein said first electrical pad is substantially parallel to said bottom surface.

7. The combination of claim 4, wherein said first electrical pad is spaced from said monitoring device by a portion of said encapsulation material.

8. The combination of claim 2, wherein said antenna is embedded within said patch.

9. The combination of claim 8, wherein said second electrical pad is embedded within said patch.

10. The combination of claim 9, wherein said patch has a top surface, said second electrical pad being disposed adjacent said top surface.

11. The combination of claim 10, wherein said second electrical pad is substantially parallel to said top surface.

12. The combination of claim 10, wherein said monitoring device has a bottom surface seated on said top surface of said patch; said first electrical pad being disposed adjacent said bottom surface.

13. The combination of claim 12, wherein said monitoring device is an active radio device and includes a battery.

14. A monitoring device and patch combination used to monitor the conditions of a pneumatic tire having an innerliner, the combination comprising:
    a monitoring device having at least one sensing element;
    a patch carrying said monitoring device, said patch adapted to connect the monitoring device to the innerliner of the pneumatic tire;
    an antenna carried by said patch;
    said monitoring device and said antenna being spaced apart and aligned to provide a signal coupling between said monitoring device and said antenna; and
    said patch including a foot portion, said antenna carried by said patch in said foot portion.

15. The combination of claim 14, wherein said patch includes a top surface, said monitoring device connected to said patch at said top surface, said foot portion extending away from said top surface.

16. A method of mounting a monitoring device on an innerliner of a tire comprising the steps of:
    providing a monitoring device having at least one sensing element;
    providing a patch having an antenna;
    connecting the monitoring device to the patch whereby the monitoring device is aligned with and spaced from the antenna to provide a signal coupling between the monitoring device and the antenna;
    connecting the patch to the innerliner of the tire;
    providing a first electrical pad connected to the monitoring device and a second electrical pad connected to the antenna; and aligning the electrical pads in a spaced apart disposition to provide the signal coupling between the monitoring device and the antenna.

17. The method of claim 16, wherein the step of providing a monitoring device includes the step of encapsulating the monitoring device and first electrical pad with an encapsulation material.

18. The method of claim 17, wherein the step of providing a patch include the step of embedding the antenna and second electrical pad within the patch.

19. The method of claim 16, wherein the step of connecting the patch to the innerliner of the tire is performed before the step of connecting the monitoring device to the patch.

20. The method of claim 19, further comprising the step of stitching the patch to the innerliner of the tire.

21. A method of mounting a monitoring device on the innerliner of a tire comprising the steps of:
provide a monitoring device having at least one sensing element;
providing a patch having an antenna;
curing the patch to the innerliner of the tire; and
connecting the monitoring device to the patch whereby the monitoring device and antenna are aligned and spaced apart to provide a signal coupling between the monitoring device and the antenna.

22. The method of claim 21, further comprising the steps of providing a first electrical pad connected to the monitoring device and a second electrical pad connected to the antenna and aligning the electrical pads in a spaced apart disposition to provide the signal coupling between the monitoring device and the antenna.

23. The method of claim 22, wherein the step of providing a patch includes the step of providing a patch having an anchoring layer, a cover, and a layer of cure material disposed between the anchoring layer and the cover.

24. The method of claim 23, further comprising the step of removing the cover and layer of cure material after the step of curing the patch occurs.

25. The method of claim 22, further comprising the steps of providing an attachment patch, mounting the monitoring device on the attachment patch, and mounting the attachment patch on the patch after the step of curing occurs.

26. The method of claim 25, further comprising the step of locating the first electrical pad in the attachment patch.

27. A method of mounting a monitoring device on the innerliner of a tire, comprising the steps of:
providing a monitoring device having at least one sensing element;
providing an antenna adapted to be carried by the innerliner;
aligning the monitoring device with the antenna;
attaching the monitoring device to the innerliner whereby the monitoring device is aligned with and spaced from the antenna to provide a signal coupling between the antenna and the monitoring device;
providing a first electrical pad connected to the monitoring device and aligning the first electrical pad with the antenna to provide the signal coupling between the monitoring device and the antenna.

28. The method of claim 27, further comprising the step of embedding the antenna within the innerliner.

29. The method of claim 27, further comprising the steps of providing an attachment patch, mounting the monitoring device on the attachment patch, and locating the first electrical pad in the attachment patch.

30. In combination, a tire and a monitoring device, said tire having an innerliner and an antenna connected to said innerliner;
said monitoring device having at least one sensing element for sensing an engineering condition of the tire;
said monitoring device mounted on said innerliner whereby said monitoring device is aligned with and spaced from said antenna to provide a signal coupling between the monitoring device and the antenna; and
said antenna being embedded within said innerliner.

31. In combination, a tire and a monitoring device, said tire having an innerliner and an antenna connected to said innerliner;
said monitoring device having at least one sensing element for sensing an engineering condition of the tire
said monitoring device mounted on said innerliner whereby said monitoring device is aligned with and spaced from said antenna to provide a signal coupling between the monitoring device and the antenna;
an attachment patch, said monitoring device being mounted on said attachment patch.

32. The combination of claim 31, further comprising an electrical pad disposed in said attachment patch; said electrical pad aligned with and spaced from said antenna.

33. The combination of claim 31, wherein the antenna is connected to the innerliner by a first patch.

34. The combination of claim 33, wherein the antenna is embedded within the first patch.

35. A monitoring device and patch combination used to monitor the conditions of a pneumatic tire having an innerliner, the combination comprising:
a monitoring device having at least one sensing element;
an attachment patch carrying said monitoring device;
an anchoring layer adapted to adhere to the innerliner of the tire;
an antenna carried by said anchoring layer; and
said attachment patch attached to said anchoring layer with said monitoring device and said antenna being aligned and spaced apart to provide a signal coupling between the monitoring device and the antenna.

36. The combination of claim 35, further comprising a first electrical pad connected to said monitoring device and a second electrical pad connected to said antenna; said pads being aligned and spaced apart to provide the signal coupling between the monitoring device and the antenna.

37. The combination of claim 36, wherein said first electrical pad is carried by said attachment patch and said second electrical pad is carried by said anchoring layer.

38. In combination, a monitoring device, an antenna, and a pneumatic tire;
the monitoring device and antenna being carried by the pneumatic tire;
the monitoring device having at least one sensing element adapted to sense at least one engineering condition of the pneumatic tire;
the antenna being adapted to send a signal out of the pneumatic tire;
the antenna being spaced from the monitoring device and being free of a direct physical connection with the monitoring device;
the antenna having a coupling portion;
the monitoring device having a coupling portion; and
the coupling portion of the antenna being spaced from and aligned with the coupling portion of the monitoring device to provide signal coupling allows the monitoring device to communicate with the antenna.

39. The combination of claim 38, wherein the antenna is embedded within the pneumatic tire.

40. The combination of claim 38, further comprising a patch connected to the pneumatic tire.

41. The combination of claim 40, wherein the antenna is connected to the patch.

42. The combination of claim 40, wherein the monitoring device is connected to the patch.

43. The combination of claim 42, further comprising a second patch; the antenna being connected to the second patch.

44. In combination, a monitoring device, an antenna, and a pneumatic tire;

the monitoring device and antenna being carried by the pneumatic tire;

the monitoring device having at least one sensing element adapted to sense at least one engineering condition of the pneumatic tire;

the antenna being adapted to send a signal out of the pneumatic tire;

the antenna being spaced from the monitoring device and being free of a direct physical connection with the monitoring device; and coupling means for signal coupling the monitoring device with the antenna without creating a direct physical connection between the antenna and the monitoring device.

45. The combination of claim 44, wherein the antenna is embedded within the pneumatic tire.

46. The combination of claim 44, further comprising a patch connected to the pneumatic tire.

47. The combination of claim 46, wherein the antenna is connected to the patch.

48. The combination of claim 46, wherein the monitoring device is connected to the patch.

49. The combination of claim 48, further comprising a second patch; the antenna being connected to the second patch.

* * * * *